United States Patent [19]

Neff

[11] Patent Number: 4,612,817

[45] Date of Patent: Sep. 23, 1986

[54] CIRCULATING BALL WORM DRIVE

[75] Inventor: Karl Neff, Waldenbuch, Fed. Rep. of Germany

[73] Assignee: Neff Gewindespindeln GmbH, Waldenbuch, Fed. Rep. of Germany

[21] Appl. No.: 613,373

[22] Filed: May 23, 1984

[30] Foreign Application Priority Data

Jun. 29, 1983 [DE] Fed. Rep. of Germany ....... 3323345
Jun. 29, 1983 [DE] Fed. Rep. of Germany ....... 3323347

[51] Int. Cl.⁴ .......................... F16H 1/18; F16H 1/20; F16H 55/08
[52] U.S. Cl. ............................. 74/424.8 NA; 74/459; 74/424.8 R
[58] Field of Search ........... 74/424.8 A, 459, 424.8 R, 74/89.15, 424.8 NA, 457, 216.3

[56] References Cited

U.S. PATENT DOCUMENTS

| 2,450,282 | 9/1948 | Jackson | 74/424.8 R |
| 2,895,343 | 7/1959 | Orner | 74/424.8 R |
| 3,009,367 | 11/1961 | Striggow | 74/459 |
| 3,198,029 | 8/1965 | Orner | 74/459 |
| 3,393,575 | 7/1968 | Irwin | 74/424.8 R |
| 3,393,576 | 7/1968 | Carlson | 74/424.8 R |
| 4,074,587 | 2/1978 | Brusasco | 74/459 |
| 4,186,620 | 2/1980 | Brusasco | 74/459 |
| 4,274,297 | 6/1981 | Blurock et al. | 74/89.15 |
| 4,364,282 | 12/1982 | Nilsson | 74/424.8 A |
| 4,474,073 | 10/1984 | Blaurock et al. | 74/424.8 A |

FOREIGN PATENT DOCUMENTS

| 2928717 | 1/1981 | Fed. Rep. of Germany | 74/424.8 R |
| 8236312 | 4/1983 | Fed. Rep. of Germany | |
| 2530768 | 1/1984 | France | 74/424.8 R |
| 1051363 | 12/1966 | United Kingdom | |

Primary Examiner—Kenneth J. Dorner
Assistant Examiner—Michael D. Bednarek
Attorney, Agent, or Firm—Frishauf, Holtz, Goodman & Woodward

[57] ABSTRACT

To facilitate manufacture of accurately formed tracks (6) within a circulating nut (10) on a spindle (1), the nut is formed with insert strips (4) shaped to receive the balls (3), the insert strips defining said track and, for example, being formed as part semi-circular trough-like sheet steel elements bent into spiral form, with circulating return portions (7) for the balls formed in either the nut, or extending from, and joining adjacent terminal portions of the strips. To prevent loss of balls, an elastic, e.g. plastic tape (189) with laterally projecting wings (19) is positioned between the tracks (6) defined by adjacent strips, partly overlapping the balls (3) in the tracks, additionally providing reservoirs for lubricant and excluding contamination of the track within the nut by dirt, grit and the like.

22 Claims, 8 Drawing Figures

CIRCULATING BALL WORM DRIVE

The present invention relates to a circulating ball worm drive of the type in which a worm nut surrounds a threaded spindle, and the worm nut is formed with internal grooves to retain balls which run in the threads of the spindle so that, upon rotation of the spindle and restraint of the nut against rotation, the nut will move longitudinally of the spindle; or, in the reverse, upon rotation of the nut, the spindle will be moved longitudinally, if restrained against rotation. The restraint may be total, or partial, so that the relative longitudinal displacement/rotary speed ratio is changeable.

BACKGROUND

Recirculating ball worm drives have been proposed in which a groove is cut into the worm nut so that the balls can be partly retained in the groove in the nut. One or more return ducts are formed in the nut, depending on the load which can be transmitted by the drive. The return duct is so arranged that the end portion of one helical path cut in the nut extends to another terminal portion of the nut, for example close to the starting portion of the same helical turn. The return ducts have usually been made as separate elements, fitted in suitable recesses or bores formed in the nut. It is difficult to manufacture such duct portions. The surface of the nut which defines the circulating path for the balls must be accurately machined in order to prevent play, and to provide accurate guidance to the balls, free from undesired clearances. Consequently, manufacturing such a spindle nut was expensive, since internal grinding was necessary. Assembly of the nut about the spindle, with the balls properly located, is complex and hence expensive. Careless handling of the spindle drive may result in excess movement of the nut to an end portion of the spindle, so that balls might fall out of the grooves formed in the nut and in the spindle, causing loss of some of the balls. Only a very limited selection of material is available for the nut, since the helical groove for the balls in the nut must be hard and strong, to permit transfer of forces between the nut and the spindle without deformation of the grooves in the nut and in the spindle, in which the balls run.

THE INVENTION

It is an object to provide a recirculating ball worm drive which is of high quality, simple to make, and permits use of a wide choice of materials for the nut, for example to permit making the nut of plastic or metal injection molded or cast material, and in which, preferably, the loss of balls from the worm drive can be easily avoided, even if the worm drive is carelessly or improperly handled.

Briefly, the nut comprises a sleeve-like nut body within which a helical, at least in part essentially half-round insert strip is located, shaped to receive the balls, forming and defining the track in which the balls are to run. The insert strip is additionally shaped and formed to define, at least in part, the recirculating connection or recirculating portion which extends in generally axial or inclined axial direction between neighboring terminal portions or terminal regions of the insert strip.

In accordance with a preferred feature of the invention, a strip or tape of flexible material is located in the nut adjacent the helical insert strip portions, and securely retained therein, the strip or tape being formed with a holding portion which engages the balls, by partly overlapping the balls when positioned in the track. Thus, the balls are retained in the track, and loss of the balls upon separation of the nut from the spindle is avoided.

In accordance with a preferred feature of the invention, the recirculating portion is formed by an integral transversely extending portion or extension of the shaped insert strips.

The insert strips which receive the ball can be formed as closed rings; for ease of manufacture, however, the insert rings may be formed of two half-rings which are abutted at their respective ends against each other.

The insert rings may be made of punched or pressed sheet metal; for example, they may be made of a pre-bent metal trough element which is cut to suitable length, and then bent into half-ring form, with connected ends, or with provisions for an extension of the recirculating track portion.

DETAILED DESCRIPTION

Figure 1:
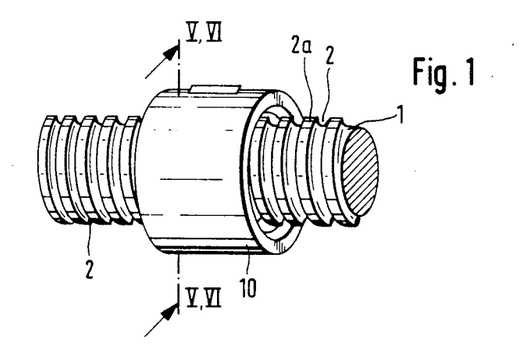
FIG. 1 is a generally perspective view of a recirculating worm or spindle drive.
Figure 1A:
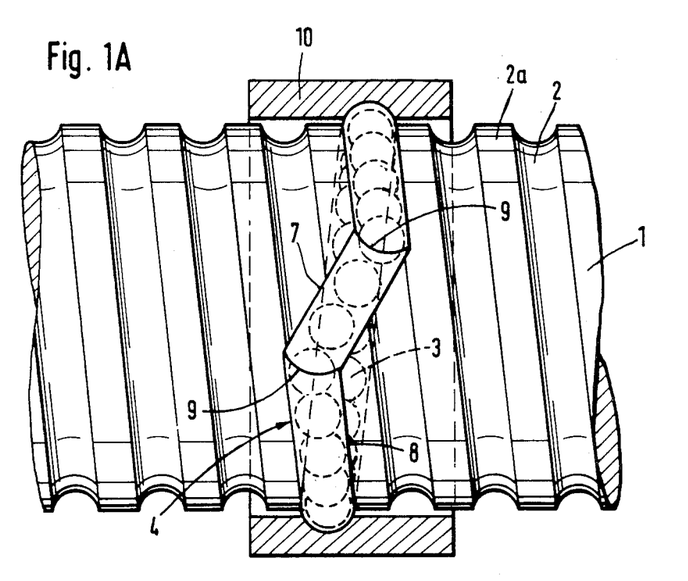
FIG. 1A is an axial cross-sectional view through the spindle nut, and showing the spindle in side elevation.
Figure 2:
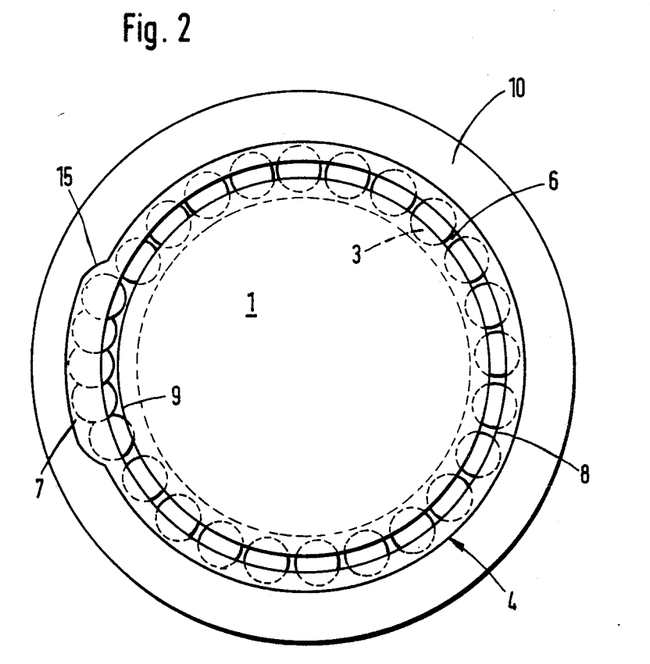
FIG. 2 is an end view of the spindle drive.
Figure 5:
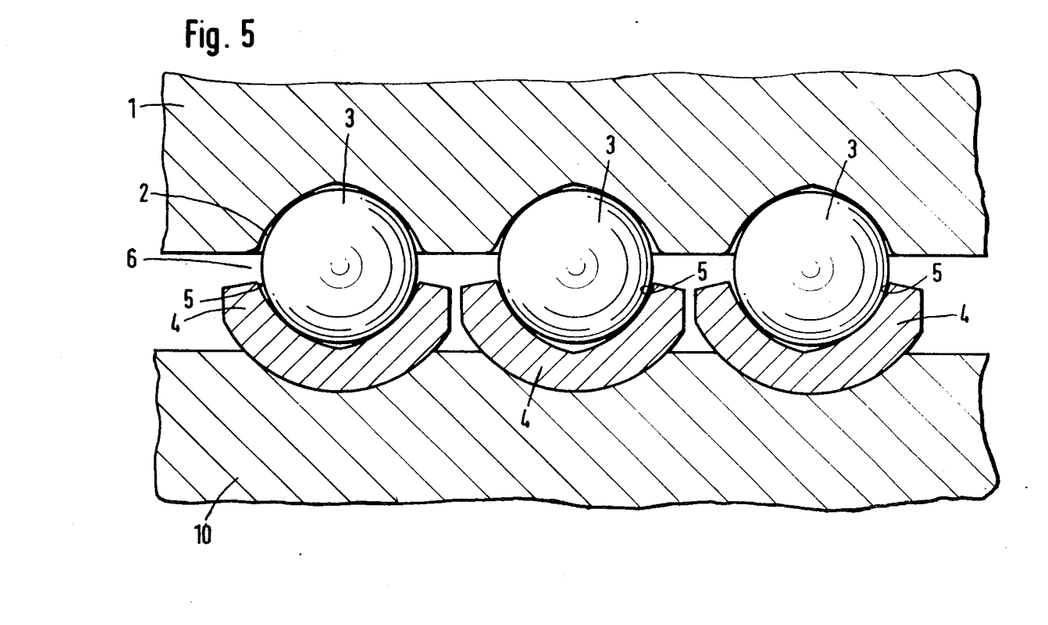
FIG. 5 is a fragmentary axial sectional view of the rings for the balls, the spindle in part section, and the nut body—all to a scale different from prior representations.

The drive illustrated in FIGS. 1, 1A, 2 has a cylindrical spindle 1 which has a helical threaded groove 2 formed therein. The groove 2 is, essentially, part-circular in cross section, and matches the external shape of ball 3 (FIG. 1A). A shaped, profiled ring 4, closed in itself, is located on the spindle 1, the ring 4 being made of sheet steel and having a substantially uniform cross section which is best seen in FIG. 5, e.g. essentially part-circular at the inside. It may be slightly deformed from exact circular shape to provie space and reservoir for lubricant. The ring 4 is helically shaped in accordance with the grooves 2 in the spindle 1, and defines at the inside an essentially part-circular helical groove 5 which, in combination with the groove 2 of the spindle 1, defines a ball circulating track 6, in which the balls 3 are located. The helical grooves 2 in the spindle 1 are separated by lands or ribs or ridges 2a.

The ring 4 extends over the major portion of the helical path for the balls and is formed with a portion 7 extending at a sharp inclination, essentially helically axially, or transversely between adjacent terminal portions of a helical loop of the ring 4. The portion 7 forms the recirculating portion for the balls 3. The short recirculating portion 7—as best seen in FIG. 2—has a greater diameter than the remainder of the helical portion which forms part of a matching track for the groove 2 of the spindle 1 in order to permit the balls 3 to jump over the ridges 2a between adjacent terminal portions of any one of the helical grooves in the spindle 1. Thus, the edges of the track elements 4 follow the essentially circular helical path 8 of the groove 4, except in the regions where the balls are to cross over from one terminal portion of a groove to another. The short portion 7 can be connected with the terminal portion of a ring 4 at the side 8, for example by welding, as shown at 9 (FIG. 1A); alternatively, the entire ring 4 may be formed as a single shaped, punched, extruded or pressed or swaged element, made for example by swaging of sheet steel after cutting of a suitable blank, and subsequent shaping and bending of the blank.

The profile ring 4 is securely and non-rotatably connected with an essentially internally cylindrical nut body 10. It may by injection-molded therein or cast therein. The nut body 10 can be made of any suitable material, as desired, for example plastic, die-casting, or the like, for example using lightweight materials, such as aluminum or aluminum-based alloys.

Figure 3:
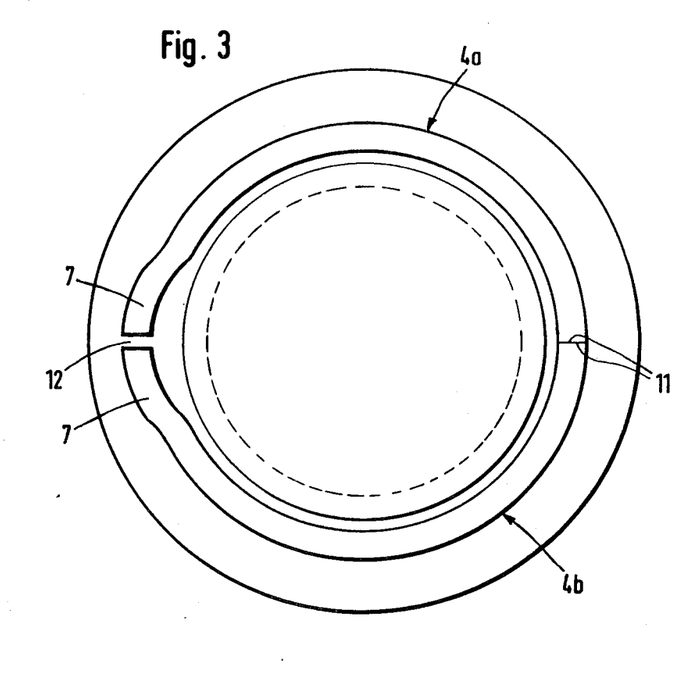
FIG. 3 is an end view of another form of the spindle drive.
Figure 4:
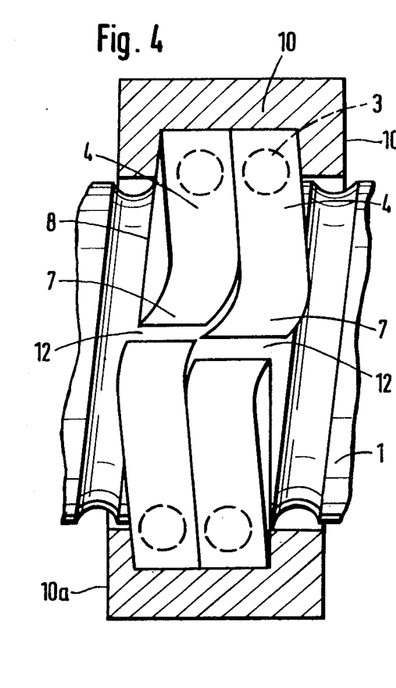
FIG. 4 is a part-sectional axial view of the nut, showing the tracks for the balls in schematic form, and the spindle in side view.

The number of the profiled rings can be suitably selected in dependence on desired operating parameters and load carrying capability. As best seen in FIGS. 3 and 4, two rings 4 can be located adjacent each other in one nut element 10, each one being formed with a short ball recirculating or return portion 7, and otherwise with a portion 8 which, generally, follows a helical path. The two rings 4, in accordance with a feature of the invention, are each made of two separate elements—see FIG. 3—each separate element being made of a half-ring 4a, 4b (FIG. 3). The half-ring elements 4a, 4b are fitted against each other and form butt joints, as shown at 11. The gap 12 has been exaggerated for better illustration in the drawing. The two rings 4 are biassed against each other axially with respect to the spindle 1, so that, upon loading in one axial direction, one profile ring 4 will be the primarily bearing ring, and, upon reverse loading in axial direction, the other profile ring 4 will be the primary load carrying ring. This bias is readily obtained by slightly twisting the two adjacent rings 4 with respect to each other, and then positioning them in the nut body 10 in such slightly twisted position, by injection-molding, die-casting, or the like, when so positioned.

The two profiled ring portions 4a, 4b (FIG. 3) can be easily made to accurate dimensions from sheet steel by suitable metal-forming tools for swaging an bending of sheet metal. The balls have been omitted from FIG. 3 for clarity, and only two balls for each one of the rings are shown in FIG. 4, also for clarity.

Figure 6:
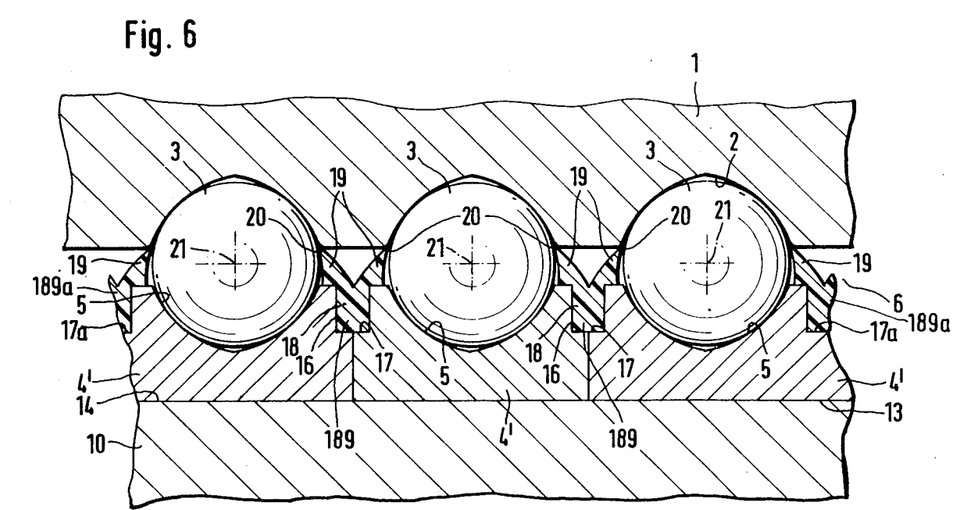
FIG. 6 is a view similar to FIG. 5, and illustrating another embodiment of the tracks for the nuts, and a further feature of the invention related to holding the balls in position.
Figure 6A:
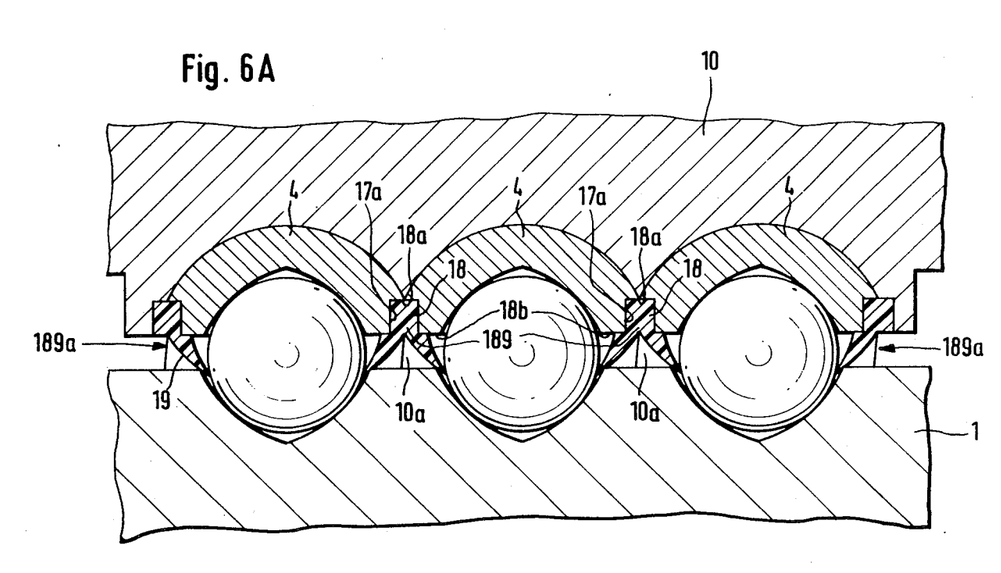
FIG. 6A is an illustration similar to FIG. 5, and showing the holding strips for the balls assembled to individual profile rings slightly different from those in FIG. 5.

The number of rings 4 inserted in the nut body 10 depends on the loading and load carrying capacity of the worm or spindle drive. FIGS. 5, 6, 6A illustrate three rings 4 which may be either unitary elements together with the respective short return duct portion 7, or which may be made as multi-part elements as illustrated in FIGS. 3 and 4. If made as multi-part elements, it is usually not necessary to provide a special connection of the parts 4a, 4b at their abutting ends or faces, since the respective parts 4a, 4b are securely retained within the nut body 10, and thus are secured therein with respect to each other as well.

FIG. 6 illustrates an embodiment in which the adjacent track portions 6 for the balls 3 are formed by shaped rings 4' which have an external cylindrical surface, defining a common cylindrical surface 13, positioned in a suitable cylindrical bore 14 of the nut body 10. The nut body 10 may be formed with a groove 15 (FIG. 2) for rotary positioning of the elements 4' which can be formed with suitable axial projections fitting into the groove 15, and thereby permitting axial insertion of the respective elements 4' into a cylindrical nut. Each one of the rings 4' is formed with a laterally circumferential recess 16 such that two adjacent elements 4' define a helical groove 17 of essentially rectangular cross section. The shape of the groove can be suitably selected, for example to be of dovetail shape, part-circular or partly rounded. In accordance with a feature of the invention, an elastic plastic strip is inserted in the groove 17. The strip has a rib-like holding portion 18, fitted in the groove 17 and is formed with two laterally projecting holding elements 19, which define projecting lips having pointed or rather sharp edges 20, elastically engaging the adjacent balls 3 above their center lines 21, to hold the balls 3 in the associated grooves 5 of the rings 4'. The movability of the balls within the tracks 6 is hardly impaired thereby. The holding lips or wings 19 are elastically yielding such that the frictional forces applied on the balls 3 are negligible. The strips 189 thus retain the balls in position in their grooves.

Upon assembly of the nut 10 on a spindle 1, or upon removal of the nut from the spindle, the balls are thus held in position by the holding wings 19 of the strips 189. Before assembly, the balls can be readily slipped into the respective grooves, and are then retained therein. This substantially facilitates and speeds assembly of the nut on the spindle, and prevents loss of balls 3 if the spindle and the nut should become separated, for example upon careless handling.

Additional plastic strips 189a can be inserted in half-grooves 17a at the end portions of the track rings 4, 4', and retained therein, for example by an adhesive. The end strips 189a are formed, likewise, with wings 19 which extend in only one direction. These end rings 189a not only hold the balls 3 in position but, additionally, prevent penetration of contaminants in the space in which the balls run, and provide an effective barrier against penetration of grit, chips, and the like, which might interfere with free running of the balls within the respective tracks and grooves internally of the nut. Additionally, the end strips 189a can be suitably shaped for retention of lubricant within the track portions of the nut.

Various ways are possible to manufacture the profile rings 4,'; they may be made already of trough-like pre-manufactured elongated material. Suitable lengths can be cut from elongated strip or roll, bent on a spring-metal bending machine, and then connected at the ends, for example by welding, brazing, or the like. Final end-side connection may be eliminated if a nut body 10 is used which is so shaped that the rings 4 are radially secured—see, for example, the nut body of FIG. 4 with radially inwardly projecting end lips 10a. In another embodiment, each one of the rings 4 may be formed with only a single portion 8 which is helically shaped, and following the helical path of the helical groove 2 in the spindle 1, to be then joined by a return duct portion formed in the nut body 10 itself which either may be a return duct groove or may be a separate return duct portion element, fitted into a bore or recess in the nut body 10 which, otherwise, does not have a helical groove at all.

It is also possible to make the inserts 4'—see FIG. 6—as unitary elements, that is, in form of a unitary sleeve. It is, however, difficult to form the helical groove 17 for the insert strip in a single element, and the construction shown in FIGS. 1–6 is preferred.

FIG. 6A shows the construction of FIG. 5 with a flexible strip 189 inserted in grooves 17a formed between metal elements 4. The metal elements 4 are shaped to receive the holding ribs 18 of the flexible strips 189, and define seating or abutment shoulders 18a, 18b at adjacent sides to provide for seating surfaces of the strips 189 which are suitably shaped to meet these abutment shoulders, and securely seat against the seating surfaces formed thereby. Spaces 10a between the wings of the strips 189 may provide reservoirs for lubricant. The strips 189, 189a are made of a flexible elastic material which is essentially immune to attack by lubricants or other fluids encountered in the environment within which the worm drive is to be used, for example nylon or the like.

The profile rings may, therefore, be made as separate ring elements 4 which can be directly connected with the nut, that is, the element which accepts the load or torque. The construction shown in FIG. 6 is particularly suitable, especially if the elements are formed with a radially and axially projecting rib or fin which can be fitted in a similar radially and axially extending groove in the nut body 10, to prevent relative rotation. The tracks in which the balls 3 run are made in the profile ring itself, or in the profile ring or track elements; thus, the nut may be made of any material, with coloring, if desired, in accordance with design requirements. The rings can be cast or injection-molded, and the process of attaching the track elements 4, 6 is widely selectable in accordance with available machinery. In accordance with a feature of the invention, the profile ring may have a circumferential surface which is adjacent the ball return duct, to be fitted in a cylindrical bore of the nut body formed with a suitable longitudinal groove-like extension to receive the return duct portion—see FIG. 3.

Drives which require tight connection, and in which freedom from play is important, so that precise guidance and precise transfer of rotary-to-linear motion is obtained, preferably use more than one helical duct strip element 4 or 4', in which the profile-shaped rings are axially biassed against each other, each one of the rings accepting the primary loading in respective opposite directions of movement or rotation of the nut or spindle, respectively.

The shaped track rings 4, 4' can be easily made as mass-production articles with high accuracy, using sheet steel or other sheet metal as the base material. Preferably, a suitably cut length from a trough-like strip or roll is used as the starting material, bent into helical shape and connected to or formed with the ball recirculating or return line portion. By suitable choice of the number of adjacent rings, it is readily possible to match the load carrying capability of the spindle drive to design requirements by merely increasing the number of helical track portions. Manufacture, thus, is greatly simplified since the track portions themselves all will be identical.

The use of flexible strips 189, see FIGS. 6, 6A, is particularly desirable in order to simplify assembly, and exclude dirt and contamination from the inside of the spindle drive. Preferably, a flexible tape or strip is provided which is held in the groove, the tape or strip extending throughout the circumference of the respective track. The strip simultaneously, thus, retains the balls in position while preventing contamination by dirt, grit, machining chips, and the like. The strip itself can be made of pre-molded material, held in position by frictional engagement, an adhesive, or by a dovetail connection with a matching groove formed in the immediately adjacent portions of the track elements 4, 6, respectively. For most applications, it is sufficient to form the groove with rectangular cross section, and snapping the flexible tape or band or ribbon 180 with its holding portion 18 into the matching groove. Since the material is elastic, it is easily possible to also snap it into a groove which is circularly expanded, or generally of dovetail shape.

The strip or tape is preferably located between two adjacent helical tracks in the nut, so that a single strip can hold the balls in two adjacent helical tracks. The strip preferably extends over the entire circumference of the bore in which the tracks are located, although it may be interrupted or cut in the region of the recirculating duct; the recirculating duct may, however, also be formed to pass over the strip, with the flexible strip or tape being depressed to permit the balls to slide thereover, or being left free from restraint between adjacent track portions, permitting the balls to slip thereunder.

Various changes and modifications may be made, and any features described herein may be used with any of the others, within the scope of the inventive concept. Specifically, the strip 189, although not strictly necessary, can be used with any of the embodiments, or selectively omitted. The strip 189 may also be used with spindle nuts of different configuration.

I claim:

1. Circulating ball worm drive having
   a worm nut (10) formed with a helical track (6) therein, a worm spindle (1) formed with a helical groove (2) at its circumference, and balls (3) retained between said track and groove and forming a worm drive connecting the nut and the spindle,
   a recirculating connection (7) between adjacent turns of the helical track in the nut, formed in the nut and connecting a terminal portion of one turn of the track with an adjacent terminal portion of said one turn to permit endless recirculation of the balls in the track defining that turn,
   wherein the nut comprises
   a sleeve-like nut body (10) formed with an inner bore;
   wherein an insert strip (4, 4') is provided, forming and defining said track, said insert strip being shaped, in cross section, of essentially half-round configuration, said insert strip receiving said balls (3) and having a helical portion matching said track, extending over a major extent of one turn only of the helical groove (2) and a recirculating connection portion (7) extending between lateral neighboring terminal portions of the helical portion of the insert strip;
   and wherein the insert strip (4, 4') comprises shaped sheet metal of substantially uniform cross section.

2. Drive according to claim 1, further comprising a tape or strip (189) of flexible material, located in the nut body, helically extending adjacent the helical track (6) therein and securely retained in the nut body, said tape being formed with a holding portion (19) at least in part overlapping the balls (3) received in the insert strip, said tape retaining the balls in the insert strip and separating the track from regions outside of the track.

3. Drive according to claim 1, wherein the helical portion of the insert strip (4) comprises an essentially complete spiral loop or ring.

4. Drive according to claim 1, wherein the insert strip comprises two half-ring parts (4a, 4b), each of essentially semicircular extent, and fitted in abutting relation against each other at at least one matching end portion.

5. Drive according to claim 1, wherein the insert strip (4) is retained in the nut body (10) by being cast or molded therein.

6. Drive according to claim 5, wherein the nut body comprises a plastic material.

7. Drive according to claim 1, wherein the insert strip (4) is formed with an external essentially cylindrical surface, fitted into the bore of the nut body (10).

8. Drive according to claim 1, wherein at least two insert strips (4) are provided, each in the shape of a spiral ring, said spiral ring strips being axially pre-stressed or biassed with respect to each other.

9. Drive according to claim 2, wherein said tape or strip (189) comprises plastic material.

10. Drive according to claim 2, wherein the tape or strip comprises a holding rib (18) and laterally projecting lip or wing portions (19) unitary with the holding rib, the lip or wing portions engaging and partly overlapping and surrounding the balls (3) in the adjacent track.

11. Drive according to claim 10, further comprising a groove (17) formed in the portion adjacent the track, the holding rib being secured in said groove.

12. Drive according to claim 2, wherein
at least two insert strips are located within the bore of the nut body (10);
and wherein the tape (189) is located between two neighboring or adjacent insert strips (4), and the lip or wing portions (19) extend from the holding rib (18) in opposite direction and overlap, at least in part, the balls in adjacent insert strips.

13. Circulating ball worm drive having
a worm nut (10) formed with a helical track (6) therein, a worm spindle (1) formed with a helical groove (2) at its circumference, and balls (3) retained between said track and groove and forming a worm drive connection between the nut and the spindle;
a recirculating connection (7) between adjacent turns of the helical track in the nut, formed in the nut and connecting terminal portions of one turn, or loop, of the track with an adjacent terminal portion of said one turn or loop to permit endless recirculation of the balls within the groove and track in said turn or loop,
and comprising, in accordance with the invention,
a tape or strip (189) of flexible material, located in the nut, helically extending adjacent the helical track (6) therein and securely retained in the worm nut, said tape or strip (189) being formed with a holding portion (19) engaging the balls (3) located in the track (6) of the worm nut, retaining the balls in the track of the worm nut, and separating the track from regions outside of the track.

14. Drive according to claim 13 wherein said tape or strip (189) comprises plastic material.

15. Drive according to claim 13, wherein the tape or strip comprises a holding rib (18) and laterally projecting lip or wing portions (19) unitary with the holding rib, the lip or wing portions partly overlapping and surrounding the balls (3) in the adjacent track.

16. Drive according to claim 13, further comprising a groove (17) formed in the portion adjacent the track, the holding rib being secured in said groove.

17. Drive according to claim 16, wherein the holding rib and said groove form an interengaging, interlocking fit.

18. Drive according to claim 13, further comprising an end strip (189a) having a single holding lip or wing portion (19) extending laterally in one direction to overlap, at least in part, the balls interiorly of the nut.

19. Drive according to claim 13, wherein the tape or strip (189) comprises two holding lip or wing portions (19) extending laterally from both sides of the holding rib, and overlapping, at least in part, balls in adjacent tracks formed in the nut.

20. Drive according to claim 13, wherein the tape or strip (189) extends over the entire turn or loop of the track.

21. Drive according to claim 13, wherein the nut comprises a sleeve-like nut body (10) and a helical, in cross section essentially half-round insert strip element, shaped to receive the balls, and forming and defining said track (6);
and said insert strip element (4) includes seating surfaces (18a, 18b) fitting against and matching abutment surfaces formed on said tape or strip (189) and retaining said tape or strip in position.

22. Drive according to claim 21, wherein a plurality of insert strips (4, 4') defining said track (6) are located within the nut body, and adjacent insert strips within the nut body conjointly define said abutment surfaces for placement of said tape or strip between adjacent insert strips (4) within the nut body.

* * * * *